United States Patent [19]

Haug et al.

[11] 3,950,279

[45] Apr. 13, 1976

[54] MIXTURES, CONTAINING POLYIMIDES, WHICH CAN BE CONVERTED TO HEAT-RESISTANT FOAMED PLASTICS

[75] Inventors: Theobald Haug, Frenkendorf, Switzerland; Andre Schmitter, F-Hegenheim, France

[73] Assignee: Ciba-Geigy Corporation, Ardsley, N.Y.

[22] Filed: Jan. 14, 1975

[21] Appl. No.: 540,923

[30] Foreign Application Priority Data
Jan. 16, 1974 Switzerland............................ 571/74

[52] U.S. Cl. ......... 260/2.5 N; 260/2.5 R; 260/47 P; 260/47 UA; 260/76; 260/79.5 C; 260/47 UP; 260/78 UA

[51] Int. Cl.² ................... C08F 22/40; C08F 30/02; C08F 222/40; C08F 122/40
[58] Field of Search ............ 260/2.5 N, 2.5 R, 47 P, 260/47 UA, 76 UA, 79.5 C, 47 UP, 78 UA Primary Examiner—Joseph L. Schofer
Assistant Examiner—F. R. Cervi
Attorney, Agent, or Firm—Luther A. R. Hall

[57] ABSTRACT

A mixture which can be converted to a heat-resistant foamed plastic and which contains a polyimide of an unsaturated dicarboxylic acid, an azomethine, a solid blowing agent, and optionally a polyamine. On warming, the mixture gives a foamed plastic of high heat resistance and good resistance to chemicals.

26 Claims, No Drawings

MIXTURES, CONTAINING POLYIMIDES, WHICH CAN BE CONVERTED TO HEAT-RESISTANT FOAMED PLASTICS

The present invention relates to mixtures, containing polyimides of certain unsaturated dicarboxylic acids and azomethines, which can be converted to heat-resistant foamed plastics and give foamed plastics of high heat resistance and good resistance to chemicals.

USA Pat. Specifications Nos. 3,249,561 and 3,310,506 describe the manufacture of foamed plastics containing imide groups. For this purpose, however, it is necessary to prepare dilute solutions of polyamide-acids with very particular critical viscosities from the anhydrides of tetracarboxylic acids and from diamines, to introduce these into a particular mould, to free the product from the solvent after development of the foam structure at high temperatures (about 300°C) and to convert the product into a polyimide at higher temperatures, with elimination of low molecular compounds.

This involved process furthermore has the disadvantage of process conditions which are difficult to control, such as, for example, a uniform temperature in the entire moulding during drying and during imide formation. As a result, the cyclisation can take place incompletely. Since the cyclisation and elimination of the low molecular compounds takes place in a moulding which is already in the form of a foam, the structure of the foam, for example its density and pore size, can undergo uncontrollable or adverse changes.

USA Pat. Specification No. 3,705,188 also describes the manufacture of mouldings containing imide groups. Here, a dilute solution of a polyamide-acid is again the starting material. It is only possible to manufacture thin foamed plastic articles. The properties of the foam already formed can subsequently undergo uncontrollable adverse changes as a result of the cyclisation of the polyamide-acid to the polyimide, that is to say as a result of the elimination of low molecular compounds.

German Offenlegungsschrift No. 2,253,753 describes the manufacture of a polyimide foam from polyfunctional aromatic carboxylic acid derivatives and organic polyisocyanates. The starting materials required to manufacture the foamed plastic can only be mixed immediately before its manufacture. The manufacturing process suffers from the disadvantages of a 2-component process; the finished reaction mixture cannot be stored for a prolonged period before processing. The density of the foam is essentially determined by the amount of carbon dioxide produced. This in turn is influenced by the quantities of polyisocyanate and carboxylic acid derivative which are introduced into the mix.

According to German Auslegeschrift No. 1,912,551, polyimide foamed plastics are obtained by heating certain quantities of a polyamide-acid and a polyimide. The polyamide-acids are produced by reaction of a diamine with tetracarboxylic acid, or certain derivatives of these. The disadvantage of this process is that the low molecular compounds split off during the cyclisation serve as blowing agents during foaming. The density of the foamed plastic is essentially determined by the amount of these elimination products. This quantity in turn is determined by the amount of polyamide-acid introduced into the mix. To manufacture reproducible foams, it is necessary to manufacture, and employ, polyamide-acids containing exactly the same quantities of volatile substances. Furthermore, the manufacture of the material of lower specific gravity in the B-state requires an involved process. In addition, the manufacture of the finished foamed article requires several hours' heating to at least 250°C.

French Patent No. 1,555,564 admittedly mentions the manufacture of a multicellular material from bis-maleimide and di-primary aromatic diamines; however, all data on the starting materials, the ratio in which they are mixed, the nature and amount of the blowing agent, the processing and the end properties is lacking. The system described is rather unsuitable for the manufacture of foamed plastics; even at 200°C, the curing is too slow relative to the foaming; the foam, once formed, again collapses before it has cured. Accordingly, products with very uneven pores, that is to say products with poor end properties, are produced.

The mixtures according to the invention give foamed plastics which do not suffer from the disadvantages mentioned. They are characterised in that they contain a) a diimide or triimide of the formula I

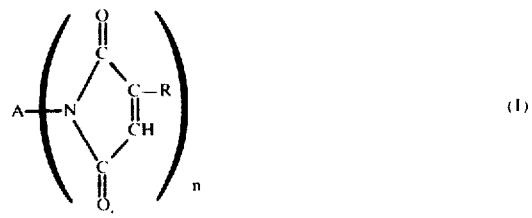

in which A denotes a n-valent organic radical with at least 2 and at most 30 carbon atoms, R denotes hydrogen or methyl and $n$ denotes 2 or 3, b) an azomethine of the formula II, III or IV

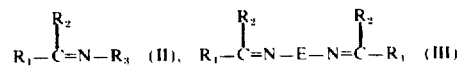

or

in which $R_1$ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, $R_2$ and $R_3$ have the same meaning as $R_1$, with the exception of hydrogen, and $R_1$ together with $R_2$ and with the inclusion of the carbon atom carrying the two substituents can also denote a cycloaliphatic ring system, and E represents a divalent organic radical with 2 to 30 carbon atoms, and c) a solid blowing agent for foaming.

Furthermore, the mixtures according to the invention preferably contain a polyamine of the formula V

in which D denotes a $y$-valent organic radical with 2 to 40 carbon atoms and $y$ denotes a number from 2 to 4.

Advantageously, they also contain a kicker or activator for the blowing agent and/or a surface-active agent.

The polyimides of the formula I are a known category of compounds and can be prepared, using the methods described in U.S. Patent Specification No. 3,010,290 and in British Patent Specification No. 1,137,592, by reaction of the corresponding diamines or triamines with maleic anhydride or citraconic anhydride in a polar solvent and in the presence of a catalyst.

The symbol A in the formula I can denote a linear or branched alkylene radical with fewer than 20 carbon atoms, a phenylene radical, a cyclohexylene radical or a radical of the formula

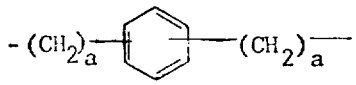

in which $a$ represents an integer from 1 to 3.

The symbol A can also comprise several phenylene or cyclohexylene radicals which can be fused together, bonded by a simple valency bond or bonded via an atom or an inert group, such as, for example, oxygen atoms or sulphur atoms, alkylene groups with 1 to 3 carbon atoms or the following groups: -CO-, -SO$_2$-, -NR- (R=alkyl), -N=N, -CONH-, -COO-, -COHN-A-NHCO- and O=P(O-)$_3$.

Furthermore, the various phenylene or cyclohexylene radicals can be substituted by methyl groups or chlorine.

Preferred triimides or diimides of the formula I are those in which A in the formula I denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclohexylene groups via a simple valency bond or via a bridge member.

Further preferred compounds of the formula I are those in which A denotes an aromatic radical with 6-30 carbon atoms, especially the p-phenylene group or two phenylene groups bonded to one another directly or via a methylene group or an oxygen atom.

Further possible polyimides are those of the formula I, in which A denotes a group of the formula VII or VIII

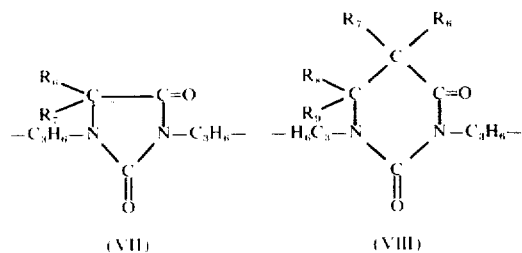

wherein R$_6$, R$_7$, R$_8$ and R$_9$ each denote hydrogen or alkyl groups with 1 to 6 carbon atoms and R$_6$ together with R$_7$ can also represent an alkylene group.

The following may be mentioned as specific examples of polyimides of the formula I: N,N'-ethylene-bis-maleimide, N,N'-hexamethylene-bis-maleimide, N,N'-m-phenylene-bis-maleimide, N,N'-p-phenylene-bis-maleimide, N,N'-4,4'-diphenylmethane-bis-maleimide, N,N'-4,4'-3,3'-dichloro-diphenylmethane-bis-maleimide, N,N'-4,4'-diphenyl-ether-bis-maleimide, N,N'-4,4'-diphenylsulphone-bis-maleimide, N,N'-4,4'-dicyclohexylmethane-bis-maleimide, N,N'-α,α'-4,4'-dimethylenecyclohexane-bis-maleimide, N,N'-m-xylylene-bis-maleimide, N,N'-p-xylylene-bis-maleimide, N,N'-4,4'-diphenylcyclohexane-bis-maleimide, N,N'-m-phenylene-bis-citraconimide, N,N'-4,4'-diphenylmethane-bis-citraconimide, N,N'-4,4'-2,2-diphenylpropane-bis-maleimide, N,N'-γ,γ'-1,3-dipropylene-5,5-dimethyl-hydantoin-bis-maleimide, the N,N'-bis-maleimide of 4,4'-diamino-triphenyl phosphate and the N,N',N''-tris-maleimide of tris-(4-aminophenyl) phosphate.

It is also possible to use mixtures of two or more of these polyimides.

The azomethines of the formulae II and III are a known category of compounds and can be prepared according to one of the known processes, such as are summarised, for example, in "Houben-Weyl," Methoden der organischen Chemie ("Methods of Organic Chemistry"), volume 11/2 (1958), page 73 et seq.

They are obtained, for example, by reacting aldehydes or ketones of the formula IX

wherein R$_1$ and R$_{hd\ 2}$ have the same meaning as in the formulae II and III, with monoamines of the formula X

or diamines of the formula XI

wherein R$_3$ and E have the same meaning as in formula II and III, in equivalent amounts and optionally in the presence of a catalyst.

The azomethines of the formula IV are also known compounds and are manufactured analogously by reacting dialdehydes or diketones of the formula XII

wherein R$_1$ and R$_2$ have the same meaning as in the formula IV, with monoamines of the formula X in equivalent amounts and optionally in the presence of a catalyst.

In the azomethines of the formulae II, III and IV the radicals R$_1$, R$_2$ and R$_3$, where they denote an aliphatic or araliphatic radical, can also contain the grouping -O-, -SO$_2$-, -CONH- or -COO- in the hydrocarbon chain. Where the radicals R$_1$, R$_2$ and R$_3$ represent aliphatic, aromatic, araliphatic, cycloaliphatic, cycloaliphatic-aliphatic or heterocyclic radicals, these radicals can also be substituted by groups which do not have an adverse influence on the addition mechanism when the mixture is cured. The following may be mentioned as examples of such groups: halogen atoms, alkyl groups, alkoxy groups, -NO$_2$, -CON(R)$_2$ or -COOR (R = alkyl) and -SO$_2$-. The heterocyclic and heterocyclic-aliphatic radical can contain the following hetero-atoms or hetero-groups: -O-, -SO$_2$-, -SO- and =N- or -NH-. Preferably, the heterocyclic radical denotes a N,N-heterocyclic radical.

The following should be mentioned in particular as carbonyl compounds of the formulae IX and XII for the preparation of the azomethines of the formulae II, III and IV: acetaldehyde, propionaldehyde, isobutyradehyde, butyraldehyde, capronaldehyde, caprylaldehyde, caprinaldehyde, tetrahydrobenzaldehyde, hexahydrobenzaldehyde, furfuraldehyde, benzaldehyde, 2-methylbenzaldehyde, p-methoxy-benzaldehyde, β-naphthaldehyde, acetone, methyl ethyl ketone, dibutyl ketone, diheptyl ketone, didecyl ketone, dibenzyl ketone, acetophenone, butyrophenone, benzophenone, 2-methylacetophenone, 4-methoxypropiophenone, cyclopentanone, terephthalaldehyde, isophthalaldehyde, glyoxal, glutaraldehyde and acetonylacetone.

The following may be mentioned in particular as monoamines of the formula X for the preparation of the azomethines of the formula III or VII: methylamine, butylamine, isobutylamine, hexylamine, dodecylamine, cyclohexylamine, benzylamine, aniline, toluidine, α-naphthylamine and β-naphthylamine.

The following may be mentioned in particular as diamines of the formula XI for the preparation of the azomethine of the formula III: ethylenediamine, 1,6-hexamethylenediamine, 3,3,5-trimethyl-1,6-diaminohexane, isophoronediamine, m-phenylenediamine, p-phenylenediamine, 4,4'-diaminodiphenylmethane, 3,3'-dichloro-4,4'-diaminodiphenylmethane, 4,4'-diaminodiphenylether, 4,4'-diaminodiphenylsulphone, 4,4'-diaminodicyclohexylmethane, m-xylylenediamine, p-xylylenediamine, 4,4'-diamino-1,1'-diphenylpropane and bis-(γ-amino-propyl)-5,5-dimethylhydantoin.

The following may be mentioned as specific azomethines: 1,6-benzylidene-hexamethylenediamine and N,N'-benzylidenediaminodiphenylmethane, as well as N,N'-benzylidene-p-phenylenediamine, benzylidenebutylamine and benzalaniline.

The polyamines of the formula V are known compounds.

If the polyamine of the formula V is a di-primary polyamine, D in the formula V preferably has the same meaning as A in the formula I and x denotes 2.

The following may be mentioned as examples of diamines of the formula V: 4,4'-diamino-dicyclohexylmethane, 1,4-diamino-cyclohexane, m-phenylenediamine, p-phenylenediamine, 4,4'-diaminodiphenylmethane, bis-(4-aminophenyl)-2,2-propane, 4,4'-diaminodiphenyl-ether, 4,4'-diaminodiphenylsulphone, 1,5-diamino-naphthalene, m-xylylenediamine, p-xylylenediamine, ethylenediamine, hexamethylenediamine, bis-(γ-amino-propyl)-5,5-dimethylhydantoin and 4,4'-diaminotriphenyl phosphate.

The use of m-phenylenediamine, 4,4'-diaminodiphenylether, hexamethylenediamine, 4,4'-diaminotriphenyl phosphate, and especially of 4,4'-diaminodiphenylmethane, is preferred.

Amongst the polyamines of the formula V other than the di-primary polyamines of the formula V, those which contain fewer than 40 carbon atoms and possess 3 or 4 $NH_2$- groups per molecule are used preferentially. The $NH_2$- groups can be bonded to a benzene ring, naphthalene ring, pyridine ring or triazine ring which is optionally substituted by methyl groups. They can also be bonded to several benzene rings, which are bonded to one another by a simple valency bond, an atom or an inert group, which have already been mentioned under the di-primary polyamines of the formula V, or by one of the following groups

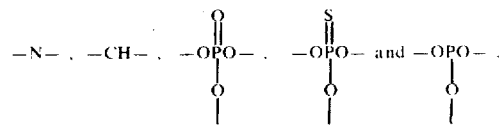

The following may be mentioned as examples of such polyamines. 1,2,4-triaminobenzene, 1,3,5-triaminobenzene, 2,4,6-triaminotoluene, 2,4,6-triamino-2,3,5-trimethylbenzene, 1,3,7-triaminonaphthalene, 2,4,4'-triaminodiphenyl, 3,4,6-triaminopyridine, 2,4,4'-triaminodiphenyl-ether, 2,4,4'-triaminodiphenylmethane, 2,4,4'-triaminodiphenylsulphone, 2,4,4'-triaminobenzophenone, 2,4,4'-triamino-3-methyl-diphenyl-methane, N,N,N-tri(4-aminophenyl)-amine, tri-(4-aminophenyl)-methane, tri-(4-aminophenyl) phosphate, tri-(4-aminophenyl) phosphite, tri-(4-aminophenyl) thiophosphate, 3,5,4'-triaminobenzanilide, melamine, 3,5,3',5'-tetraaminobenzophenone, 1,2,4,5-tetraaminobenzene, 2,3,6,7-tetraaminonaphthalene, 3,3'-diaminobenzidine, 3,3',4,4'-tetraaminodiphenyl-ether, 3,3',4,4'-tetraaminodiphenylmethane, 3,3',4,4'-tetraaminodiphenylsulphone and 3,5-bis-(3,4'-diaminophenyl)-pyridine.

The use of tri-(4-aminophenyl) phosphate and tri-(4-aminophenyl) thiophosphate or of a mixture of these is preferred.

Further preferred polyamines are those of the formula VI

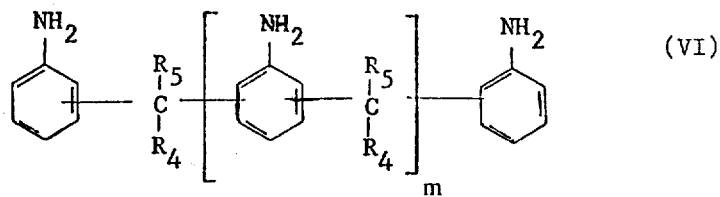

in which $R_4$ and $R_5$ each denote hydrogen, alkyl, cycloalkyl, aryl or aralkyl or together denote an alkylene group.

The polyamines of the formula VI are also known compounds and can be obtained in accordance with the processes described in French Patent Specifications Nos. 1,430,977 and 1,481,932 by reaction of primary aromatic amines with aldehydes or ketones.

Examples of aldehydes or ketones used for this purpose are formaldehyde, acetaldehyde, benzaldehyde, oenanthaldehyde, acetone, methyl ethyl ketone, cyclohexanone and acetophenone.

The ratio in which the polyimide of the formula I is mixed with the azomethine of the formulae II, III or IV can vary within a wide range. It is preferably so chosen that the reaction batch contains 2–6 equivalents of imide groups, preferably 2–3 equivalents of imide groups, per equivalent of >C=N- group. If, where appropriate, a polyamine of the formula V or VI is also added to the mixture to be foamed, the ratio in which the polyimide of the formula I, the polyamines of the formula V or VI and the azomethines of the formulae II, III and IV are mixed can vary within a wide range. The ratio of these 3 components is preferably so chosen that the reaction mixture contains 0.1 to 0.85 equivalent of primary amino group and 0.45 to 0.08 equivalent of >C=N- group per 1 equivalent of imide group, the sum of the equivalents of primary amino group and >C=N- group being 0.33 to 1.0 equivalent, preferably 1.0 equivalent, per 1 equivalent of imide group. The amounts by weight depend on the particular equivalent weights; in general, they vary between 10 and 90% of the individual components, for example between 50 and 80% for a polyimide of the formula I, between 10 and 40% for an azomethine of the formula II, III or IV and up to 30% for a polyamine of the formula V. The curable mixture can also contain several different polyimides, polyamines and azomethines.

advantageously, a curable mixture according to the invention contains (a) a triimide or diimide of the formula I, in which A denotes one of the groups (c) a solid blowing agent for foaming and (d) a polyamine of the formula V, in which y denotes the number 2 or 3.

To manufacture the foam, blowing agents which are still solid at room temperature and of which the decomposition points are between 80° and 200°C are added to the mixture. These blowing agents can be added individually or as mixtures. It is possible to use sulphonylhydrazides, for example benzenesulphonylhydrazide, p-toluenesulphonylhydrazide or 4,4'-oxydibenzenesulphonic acid hydrazide, and also substances such as azodicarboxylic acid amides or $\alpha,\alpha'$-azoisobutyronitrile. Preferably, azodicarboxylic acid amide is used as the blowing agent. The density of the new foamed plastics is largely determined by the weight ratio of reaction mixture to blowing agent; it can vary from 0.1 to 1.0. Preferably 0.5–7% of blowing agent are used.

To achieve a homogeneous pore structure, a surface-active substance can also be added, in amounts of 0.1–1% relative to the total amount of the reaction mixture.

The reactants should be ground as finely as possible and mixed as homogeneously as possible before being foamed. For example, the starting materials can be dissolved or suspended in a low-boiling medium, such as trichloromonofluoromethane (tradename "Freon 11"). After a homogeneous mixture has been formed, the medium is again removed completely. This process is particularly advisable if one reactant has a low melting point, when there is the danger of the material sticking together during grinding. Furthermore, it is important that the resin/curing agent powders should be mixed thoroughly with the blowing agent. The powder must have a homogeneous appearance. The blowing agent must not merely lie next to the matrix material but must be at least partially surrounded thereby.

An improvement in the pore structure, especially with regard to fineness of the pores, is achieved by

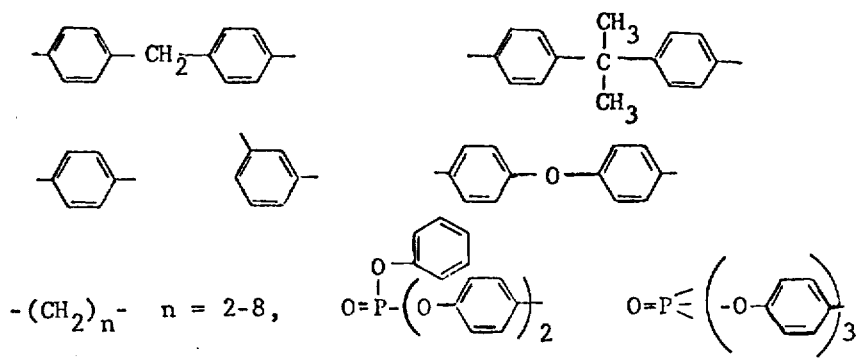

and R denotes hydrogen, (b) an azomethine of the formula II or III, in which $R_1$ denotes hydrogen, $R_2$ and $R_3$ each denote a phenyl group and E denotes one of the following groups tableting or granulating the powders obtained.

According to the invention, cured foamed articles are manufactured by warming a mixture which contains a polyimide of the formula I, an azomethine of the

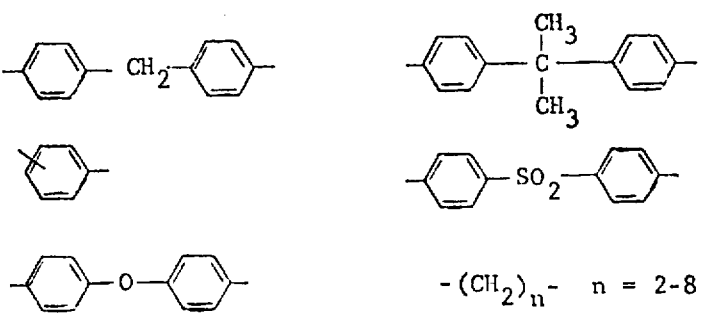

formula II, III or IV and a solid blowing agent and optionally also a polyamine of the formula V and/or a surface-active agent and/or a kicker or activator for the blowing agent, to 80°–220°C.

For this purpose, the mixture is usually introduced into a mould which can be closed if necessary. The foaming, moulding and curing take place in an oven, preferably at 160°–200°C, over the course of about ½ to 6 hours. The foamed plastic moulding formed can be taken out of the mould when it is dimensionally stable at the temperature used. If required, the moulding can be post-cured at the same temperature or at a higher temperature, in order thereby to achieve more advantageous properties in use.

The new foamed plastic articles have a high heat distortion point good resistance to chemicals and good dielectric properties.

The new foamed plastic articles can be employed advantageously wherever a foamed material of good heat stability, high heat distortion point and good dielectric properties, even at fairly high temperatures, is required. Furthermore, they can be used where the processing of the previous foamed plastics of high heat stability has entailed considerable difficulties in moulding and processing.

The foamed plastics according to the invention, and the process for their manufacture, exhibit several advantages over the known products. The starting material for the new foamed plastic already has the finished imide ring in the molecule. Accordingly, no cyclisation of the amide-acid grouping to the imide ring, with elimination of low molecular compounds, which would result in a subsequent uncontrollable or adverse change in the foam structure, takes place during curing. The blowing agent required for foaming is added to the mixture before it is cured.

A further advantage is that a finished one-component mixture can be employed for foaming and curing; the disadvantages inherent in a two-component process (2 stock vessels, 2 metering installations and a mixing device) are thus circumvented. Furthermore, the finished mixture can be stored unchanged for a prolonged period of time. Depending on requirements, the finished mixture can be stored and processed as a fine powder, as granules or as pressed tablets. The use of the mixture as tablets or granules greatly simplifies processing.

The comparatively lower processing temperature, which in most cases is below 200°C, is also advantageous.

EXAMPLE 1

35.5 g. of N,N'-4,4'-diphenylmethane-bis-maleimide, 14.5 g of 1,6-di-benzylidene-hexamethylenediamine, 0.2 g of silicone foam stabiliser and 2 g of p,p'-oxy-bis-(benzenesulphonyl-hydrazide) are well mixed as a powder in a closed vessel. The powder thus obtained has a homogeneous appearance.

50 g of this powder are fused at 100°–110°C. The resulting highly viscous liquid is poured into a steel mould of dimensions 2×14.5×10 cm which has been pre-warmed to 160°C. The mould is closed. The foamed article obtained after curing for one hour at 200°C has a fine pore structure and a density of 0.3 g/cm³.

For comparison, the following mixture is processed:

A mixture of 54 g of N,N'-4,4'-diphenylmethane-bis-maleimide, 12 g of diaminodiphenylmethane, 0.2 g of silicone foam stabiliser and 4 g of p,p'-oxy-bis-(benzenesulphonylhydrazide) is ground to give a homogeneous, fine powder.

50 g of this powder are introduced into a steel mould and converted, by curing for 2 hours at 200°C, into a foamed article which has uneven coarse pores. If the 4 g of p,p'-oxy-bis-(benzenesulphonyl-hydrazide) are replaced by 4 g of azodicarboxylic acid amide, a foamed plastic which also has a very uneven pore structure is obtained.

EXAMPLE 2

142 g of N,N'-4,4'-diphenylmethane-bis-maleimide, 58 g of 1,6-di-benzylidene-hexamethylenediamine, 14 g of azodicarboxylic acid amide and 0.4 g of silicone foam stabiliser are suspended in monofluorotrichloromethane and on vigorous stirring a homogeneous slurry is produced. The monofluorotrichloromethane is evaporated off at room temperature. After 10 hours, the slurry has changed to a solid cake, which is pulverised.

This homogeneous, fine powder is introduced into the pre-warmed steel mould mentioned in Example 1. The mould is closed and the powder is cured for 3 hours at 200°C. A foamed article having a fine pore structure and a density of 0.52 g/cm³ is produced. This foamed plastic begins to soften at 230°C.

The table which follows lists the results of a thermogravimetric analysis of this foamed plastic. The results show the excellent thermal properties of the new foamed plastic:

| °C | residual weight, % |
|---|---|
| 100 | 98.3 |
| 150 | 97.9 |
| 200 | 97.1 |
| 250 | 95.8 |
| 300 | 92.8 |
| 350 | 86.3 |
| 400 | 79 |
| 450 | 70 |
| 500 | 60 |
| 550 | 37 |
| 600 | 12 |

EXAMPLE 3

A homogeneous fine powder composed of 426 g of N,N'-4,4'-diphenylmethane-bis-maleimide, 174 g of 1,6-di-benzylidenehexamethylenediamine, 45 g of azodicarboxylic acid amide and 1.2 g of silicone foam stabiliser is produced in accordance with the procedure of Example 2.

Varying quantities of this mixture are introduced into the mould mentioned in Example 1 and cured for 3 hours at 180°C. Hard foamed articles of fine-pored structure are obtained, the density depending on the amount used:

| amount of mixture employed | resulting density |
|---|---|
| 180 g | 0.46 g/m³ |
| 170 g | 0.43 g/m³ |
| 150 g | 0.38 g/m³ |
| 130 g | 0.33 g/m³ |

EXAMPLE 4

A mixture of 50 g of N,N'-4,4'-diphenylmethane-bis-maleimide, 17 g of diaminodiphenylmethane, 10 g of N,N'-dibenzylidene-diaminodiphenylmethane, 0.2 g of silicone foam stabiliser, 6 g of azodicarboxylic acid amide, 0.5 g of cadmium stearate and 0.5 g of lead stearate is introduced into a steel mould of dimensions 4×7×1 cm which has been prewarmed to 140°C. After curing at 180°C for 2 hours, a foamed plastic of fine

EXAMPLE 5

99.5 g of diaminodiphenylmethane, 110 g of 1,6-dibenzylidene-hexamethylenediamine, 1 g of silicone foam stabiliser, 60 g of azodicarboxylic acid amide and 450 g of N,N'-4,4'-diphenylmethane-bis-maleimide are well mixed in a powder mixer.

70 g of this mixture are introduced into a cylindrical mould which can be closed and has a diameter of 10.5 and a height of 3.2 cm, and are converted, in the course of 2 hours at 200°, into a hard, fine-pored foam of density 0.25 g/cm$^3$ and glass transition temperature 230°C.

EXAMPLE 6

A powder which contains the following constituents is prepared in accordance with the procedure of Example 4: 0.2 g of silicone foam stabiliser, 9.6 g of N,N'-dibenzylidenediaminodiphenylmethane, 18.4 g of N,N'-4,4'-diphenylmethane-bis-maleimide, 3.0 g of azodicarboxylic acid amide, 0.2 g of cadmium stearate and 0.2 g of lead stearate.

After curing this mixture for 1 hour at 200°C in a closed steel mould, a foamed article having a fine pore structure and a density of 0.19 g/cm$^3$ is obtained.

EXAMPLE 7

A mixture of 17.9 g of N,N'-4,4'-diphenylmethane-bis-maleimide, 3.95 g of diaminodiphenylmethane, 0.2 g of silicone foam stabiliser, 6.3 g of N,N'-benzylidene-1,3-di(γ-aminopropyl)-5,5-dimethyl-hydantoin and 1.2 g of azodicarboxylic acid amide is pressed to form tablets weighing 7 g.

One such tablet is introduced into a closed steel mould of dimensions 4×7×1 cm and is heated therein for 30 minutes to 130°C and then for 30 minutes at 180°C. A hard foamed article having a fine and uniform pore structure and a density of 0.2 g/cm$^3$ results.

EXAMPLE 8

A pulverulent mixture of 14.32 g of N,N'-4,4'-diphenylmethane-bis-maleimide, 3.16 g of diaminodiphenylmethane, 3.40 g of 1,4-benzylidene-p-phenylenediamine, 0.7 g of azodicarboxylic acid amide and 0.1 g of silicone foam stabiliser is pressed to form tablets, as in Example 7.

One such tablet is introduced into a closed mould of dimensions 4×7×1 cm and is converted therein, in the course of 1 hour at 170°, into a hard foamed article having uniform pores.

EXAMPLE 9

A pulverulent mixture of 17.9 g of N,N'-4,4'-diphenylmethane-bis-maleimide, 3.95 g of diaminodiphenylmethane, 3.55 g of 1,2-dibenzylidene-ethylenediamine, 0.8 g of azodicarboxylic acid amide and 0.15 g of silicone foam stabiliser is pressed as in Example 7 to form tablets which, after curing for 1 hour at 190°C, give a firm foamed article of uniform pore structure.

EXAMPLE 10

A mixture composed of 17.9 g of N,N'-4,4'-diphenylmethane-bis-maleimide, 3.95 g of diaminodiphenylmethane, 4.7 g of 1,4-dibenzylidene-p-xylylenediamine, 0.8 g of azodicarboxylic acid amide and 0.15 g of silicone foam stabiliser is pressed as in Example 7 to form tablets which, after curing for one hour at 170°C, give a firm foamed article of uniform pore structure.

EXAMPLE 11

A pulverulent mixture of 17.9 g of N,N'-4,4'-diphenylmethane-bis-maleimide, 3.95 g of diaminodiphenylmethane, 6.65 g of (N,N'-di-2-chloro-benzylidene)-diaminodiphenylmethane and 0.8 g of p,p'-oxy-bis-(benzenesulphonyl-hydrazide) is pressed as in Example 7 to form tablets which, after curing for 1 hour at 180°C, give a firm foamed article of fine, uniform pore structure.

EXAMPLE 12

17.3 g of N,N',N''-tris-maleimide of tris-(4-aminophenyl)-phosphate, 7.6 g of N,N'-benzylidene-diaminodiphenylmethane, 2 g of azodicarboxylic acid amide and 0.2 g of silicone oil Si 3193 are mixed thoroughly and pressed to form tablets weighing 7 g. If one such tablet is warmed for 1 hour to 200°C in a closed mould of dimensions 3.5 × 6.5 × 1.5 cm, a hard moulding having a fine, uniform pore structure and a density of 0.2 g/cm$^3$ is produced.

EXAMPLE 13

20 g of a mixture consisting of 106 g of N,N'-4,4'-diphenylamine-bis-maleimide, 27 g of a condensation product of formaldehyde and aniline having an NH$_2$ equivalent number of 118 and 17 g of 1,6-dibenzylidene-hexamethylenediamine are ground in a ball mill together with 0.2 g of a silicone foam stabiliser and 1 g of 4,4'-oxy-bis-(benzenesulphonylhydrazide).

10 g of the resulting powder are introduced into a mould pre-warmed to 150°C.

After curing for 1 hour at 150°C and 1 hour at 180°C, the mould is opened.

The resulting foamed article has a fine pore structure and a density of 0.2 g/cm$^3$.

EXAMPLE 14

20 g of a mixture consisting of 1 mol of N,N',N''-tris-maleimide of tris-(4-aminophenyl) phosphate, 0.5 mol of 4,4'-diaminodiphenylmethane and 0.5 mol of benzalaniline are ground in a ball mill.

0.2 g of a silicone foam stabiliser and 1 g of azodicarboxylic acid amide as a blowing agent are added to this powder, and the whole is again ground in a mill.

15 g of the resulting homogeneous powder are introduced into a steel mould pre-warmed to 180°C and cured for 2 hours at this temperature. A foamed plastic which has a very attractive surface is obtained. It was a uniform pore structure and a density of 0.4 g/cm$^3$. This foam is self-extinguishing.

What we claim is:

1. A mixture which can be converted to a heat-resistant foamed plastic, characterised in that it contains a) a diimide or triimide of the formula I

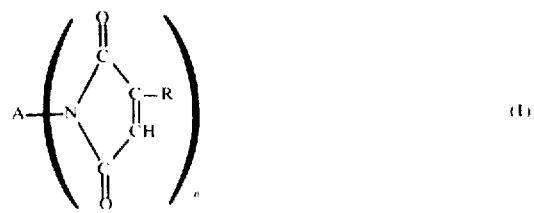

(I)

in which A denotes a n-valent organic radical with at least 2 and at most 30 carbon atoms, R denotes hydrogen or methyl and n denotes 2 or 3, b) an azomethine of the formula II, III or IV

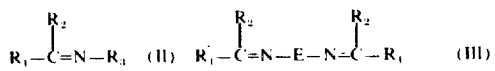

in which $R_1$ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, $R_2$ and $R_3$ have the same meaning as $R_1$, with the exception of hydrogen, and $R_1$ together with $R_2$ and with the inclusion of the carbon atom carrying the two substituents can also denote a cycloaliphatic ring system, and E represents a divalent organic radical with 2 to 30 carbon atoms, and c) a solid blowing agent for foaming.

2. A mixture according to claim 1, characterised in that it also contains a polyamine of the formula V

in which D denotes a y-valent organic radical with 2 to 40 carbon atoms and y denotes a number from 2 to 4.

3. A mixture according to claim 1, characterised in that in addition to the indicated constituents it also contains a surface-active agent and/or a kicker or activator for the blowing agent.

4. A mixture according to claim 1, characterised in that it contains, as the triimide or diimide, a compound of the formula I, in which A denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclohexylene groups via a simple valency bond or via a bridge member.

5. A mixture according to claim 2, characterised in that it contains, as the diimide or triimide, a compound of the formula I, in which A denotes an aromatic radical with 6 – 20 carbon atoms.

6. A mixture according to claim 5, characterised in that it contains, as the diimide, a compound of the formula I, in which A denotes the p-phenylene group or two phenylene groups bonded to one another directly or via a methylene group or an oxygen atom.

7. A mixture according to claim 2, characterised in that it contains 1,6-benzylidene-hexamethylenediamine or N,N'-benzylidene-diaminodiphenylmethane as the azomethine.

8. A mixture according to claim 2, characterised in that it contains, as the polyamine of the formula V, a polyamine of the formula VI

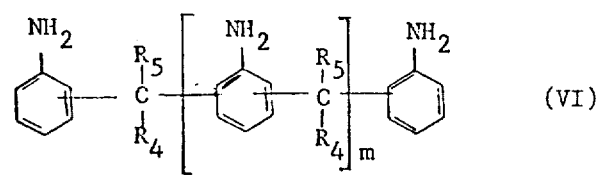

in which $R_4$ and $R_5$ each denotes hydrogen, alkyl, cycloalkyl, aryl or aralkyl or together denote an alkylene group.

9. A mixture according to claim 2, characterised in that it contains 4,4'-diaminodiphenylmethane, tri-(4-aminophenyl)phosphate or tri-(4-aminophenyl) thiophosphate as the polyamine of the formula V.

10. A mixture according to claim 2, characterised in that it contains a) a triimide or diimide of the formula I, in which A denotes one of the following groups:

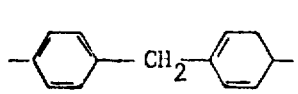
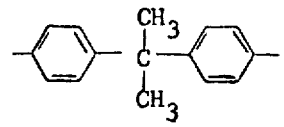

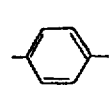
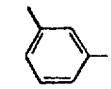
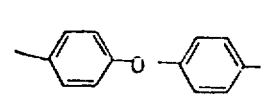

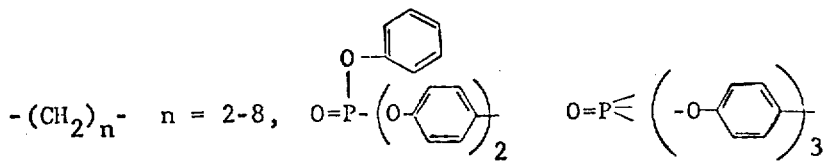

and R denotes hydrogen, (b) an azomethine of the formula II or III, in which $R_1$ denotes hydrogen, $R_2$ and $R_3$ each denotes a phenyl group and E denotes one of the following groups

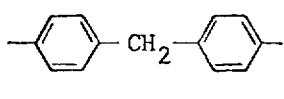 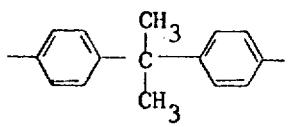

 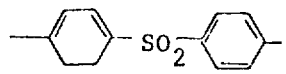

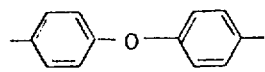 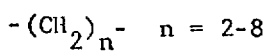  $n = 2-8$ (c) a solid blowing agent for foaming and (d) a polyamine of the formula V, in which y denotes the number 2 or 3.

11. A process for the preparation of heat-resistant foams from polyimides of unsaturated dicarboxylic acids, characterised in that a mixture containing a diimide or triimide of the formula I

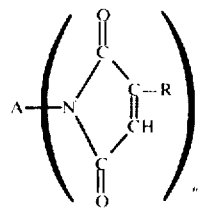 (I)

in which A denotes a n-valent organic radical with at least 2 and at most 30 carbon atoms, R denotes hydrogen or methyl and n denotes 2 or 3, (b) an azomethine of the formula II, III or IV

 (II) (III)

or

 (IV)

in which $R_1$ denotes a hydrogen atom, an aliphatic, cycloaliphatic, cycloaliphatic-aliphatic or aromatic radical with at most 12 carbon atoms, an araliphatic radical with at most 20 carbon atoms or a heterocyclic or heterocyclic-aliphatic radical, $R_2$ and $R_3$ have the same meaning as $R_1$, with the exception of hydrogen, and $R_1$ together with $R_2$ and with the inclusion of the carbon atom carrying the two substituents can also denote a cycloaliphatic ring system, and E represents a divalent organic radical with 2 to 30 carbon atoms, and (c) a solid blowing agent for foaming, is warmed to a temperature of 80°–220°C.

12. A process according to claim 11, characterised in that the mixture, which is to be warmed, also contains a polyamine of the formula V

 (V)

in which D denotes a y-valent organic radical with 2 to 40 carbon atoms and y denotes a number from 2 to 4.

13. A process according to claim 11, characterised in that the mixture is warmed to 160°–200°C.

14. A process according to claim 11, characterised in that a mixture which in addition to the indicated constituents also contains a surface-active agent and/or a kicker or activator for the blowing agent is used.

15. A process according to claim 11, characterised in that a mixture which contains, as the diimide or triimide, a compound of the formula I, in which A denotes an alkylene group with 2 to 20 carbon atoms, an aralkylene group with 8 to 12 carbon atoms, the cyclohexylene group or the phenylene group, and the phenylene and cyclohexylene groups can be substituted by methyl or chlorine and/or can be bonded to phenylene or cyclohexylene groups via a simple valency bond or via a bridge member, is used.

16. A process according to claim 12, characterised in that a mixture which contains, as the diimide or triimide, a compound of the formula I, in which A denotes an aromatic radical with 6 – 20 carbon atoms, is used.

17. A process according to claim 16, characterised in that a mixture which contains, as the diimide, a compound of the formula I, in which A denotes a phenylene group or two phenylene groups bonded to one another directly or via a methylene group or an oxygen atom, is used.

18. A process according to claim 12, characterised in that a mixture which contains 1,6-benzylidene-hexamethylenediamine or N,N'-benzylidene-diaminodiphenylmethane as the azomethine is used.

19. A process according to claim 12, characterised in that the mixture contains, as the polyamine, a polyamine of the formula VI

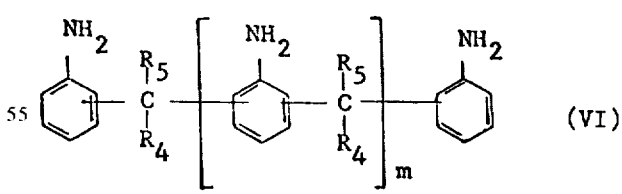 (VI)

in which $R_1$ and $R_5$ each denotes hydrogen, alkyl, cycloalkyl, aryl or aralkyl or together denote an alkylene group.

20. A process according to claim 12, characterised in that a mixture which contains 4,4'-diaminodiphenylmethane, tri-(4-aminophenyl) phosphate or tri-(4-aminophenyl) thiophosphate as the polyamine of the formula V is used.

21. A process according to claim 12, characterised in that a mixture which contains a) a triimide or diimide of the formula I, in which A denotes one of the following groups

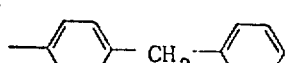 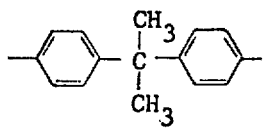

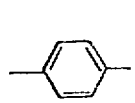  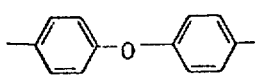

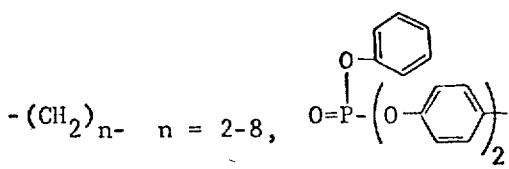 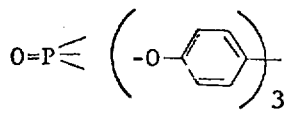

and R denotes hydrogen, (b) an azomethine of the formula II or III, in which $R_1$ denotes hydrogen, $R_2$ and $R_3$ each denotes a phenyl group and E denotes one of the following groups

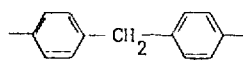 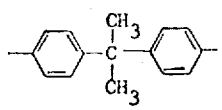

 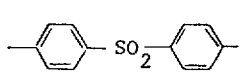

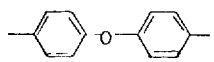 

(c) a solid blowing agent for foaming and (d) a polyamine of the formula V, in which $y$ denotes the number 2 or 3, is warmed.

22. A mixture according to claim 2, characterised in that in addition to the indicated constituents it also contains a surface-active agent and/or a kicker or activator for the blowing agent.

23. A mixture according to claim 2, characterised in that it contains, as the triimide or diimide, a compound of the formula I, in which A denotes an alkylene group with 2 to 20 carbon atoms, an aralkylene group with 8 to 12 carbon atoms, a cyclohexylene group or a phenylene group, and the phenylene and cyclohexylene groups can be substituted by methyl or chlorine and/or can be bonded to phenylene or cyclohexylene groups via a simple valency bond or via a bridge member.

24. A process according to claim 12, characterised in that the mixture is warmed to 160°–200°C.

25. A process according to claim 12, characterised in that a mixture which in addition to the indicated constituents also contains a surface-active agent and/or a kicker or activator for the blowing agent is used.

26. A process according to claim 12, characterised in that a mixture which contains, as the diimide or triimide, a compound of the formula I, in which A denotes an alkylene group with 2 to 20 carbon atoms, an aralkylene group with 8 to 12 carbon atoms, the cyclohexylene group or the phenylene group, and the phenylene and cyclohexylene groups can be substituted by methyl or chlorine and/or can be bonded to phenylene or cyclohexylene groups via a simple valency bond or via a bridge member, is used.

* * * * *